United States Patent [19]

Tsujimura et al.

[11] Patent Number: 5,022,936
[45] Date of Patent: Jun. 11, 1991

[54] METHOD FOR IMPROVING PROPERTY OF WELD OF AUSTENITIC STAINLESS STEEL

[75] Inventors: Hiroshi Tsujimura; Yasumasa Tamai; Hideyo Saito; Masahiro Kobayashi, all of Hitachi, Japan

[73] Assignee: Hitachi, Ltd., Tokyo, Japan

[21] Appl. No.: 445,535

[22] Filed: Dec. 4, 1989

[30] Foreign Application Priority Data

Dec. 7, 1988 [JP] Japan .................. 63-307853

[51] Int. Cl.$^5$ .................. C21D 9/08; C21D 8/10
[52] U.S. Cl. .................. 148/135; 148/127; 148/136; 148/903
[58] Field of Search .................. 148/127, 135, 136, 903

[56] References Cited

U.S. PATENT DOCUMENTS

| 4,239,556 | 12/1980 | Cline et al. | 148/136 |
|---|---|---|---|
| 4,394,966 | 8/1983 | Kelly et al. | 148/135 |
| 4,687,894 | 8/1987 | Koga et al. | 148/127 |
| 4,694,131 | 9/1987 | Ino et al. | 148/127 |
| 4,714,501 | 12/1987 | Yamanaka et al. | 148/13 |
| 4,721,536 | 1/1988 | Grob et al. | 148/127 |
| 4,731,131 | 3/1988 | Sakata et al. | 148/127 |
| 4,807,801 | 2/1989 | Nakamura | 148/127 |

FOREIGN PATENT DOCUMENTS

| 0234200 | 9/1987 | European Pat. Off. | 148/135 |
|---|---|---|---|
| 53-56134 | 5/1978 | Japan . | |
| 59-21711 | 5/1984 | Japan . | |
| 60-45033 | 10/1985 | Japan . | |
| 61-52315 | 3/1986 | Japan . | |
| 1096025 | 5/1986 | Japan | 148/903 |
| 1264132 | 11/1986 | Japan | 148/135 |
| 2067112 | 3/1987 | Japan | 148/135 |
| 63-177972 | 7/1988 | Japan . | |

Primary Examiner—Upendra Roy
Attorney, Agent, or Firm—Antonelli, Terry, Stout & Kraus

[57] ABSTRACT

A method for improving a property of a weld of an austenitic stainless steel which is a part of a structure being brought into contact with a corrosive fluid at a region having been affected by welding heat on both of opposed surfaces, comprising the steps of: cooling said thermally affected region on one of said opposed surfaces; and simultaneously with said cooling step, applying a melting treatment to the other surface, thereby changing the melting treatment portion into a micro structure that contains delta (δ) ferrite and is superior in corrosion resistance property. The latter surface is improved in high tensile stress generated by the welding work. Namely, its stress is reduced. The melting heat for said melting treatment is obtained by application of high density energy.

4 Claims, 4 Drawing Sheets

TS: TENSILE STRESS
CS: COMPRESSION STRESS

TS: TENSILE STRESS
CS: COMPRESSION STRESS

METHOD FOR IMPROVING PROPERTY OF WELD OF AUSTENITIC STAINLESS STEEL

BACKGROUND OF THE INVENTION

The present invention relates to a method for improving a property of a weld of an austenitic stainless steel as base metal, and more particularly to a treatment method for improving the weld of an assembled structure in which it is impossible to perform a solution heat-treatment that would be usually performed for preventing stress corrosion cracking (SCC) at the weld of the stainless steel, and a melting treatment instead of the solution heat-treatment may be performed only from one side of the weld. A high corrosion-resistance is needed for ensuring reliability and a long service life in instruments and parts used in high temperature and high pressure water containing dissolved oxygen, particularly, instruments for a boiling-water reactor (BWR). The present invention meets this requirement.

An intergranular stress corrosion cracking (SCC) (or intercrystalline fracture) is likely to be generated in a weld, that has been affected by a welding heat, of a primary cooling water pipe (made of JIS SUS304) in a boiling-water reactor (BWR). As shown in FIG. 3, the SCC is generated in the overlapped portion (4) of high tensile stress region (1) exceeding 0.2% proof stress, chromium-depleted layer (2) (sensitive region) generated along crystalline intergranular surfaces by the welding heat affect and corrosion environment (3) such as dissolved oxygen and the like.

In accordance with a conventional welding method in which the pipe made of JIS SUS 304 (austenitic stainless steel) is cooled down to room temperature, a high residual welding tensile stress up to several times of 10 kg/mm$^2$ is generated in an outer surface of the pipe by welding (refer to the welding portion 6) as shown by curve 8 in FIG. 2, in which TS denotes a tensile stress region and CS denotes a compression stress region. A line 9 denotes a reference level of 10 kg/mm. The chromium-depleted layer is formed in the heat-affected portion (or zone) 7 in the vicinity of the weld in a base metal 5a. Thus, if the corrosive fluid is brought into contact with both inner and outer surfaces of the base metal having the chromium-depleted layer and the high residual tensile stress, there is a large fear that the SCC would be generated in the heat-affected portion of the base metal.

Japanese Patent Examined Publication No. 59-21711 discloses one example of the method for coping with the SCC problem. In the method proposed in that publication, an corrosion resistant material containing delta (δ) ferrite is overlaid by welding on surfaces of a plurality of stainless steel members to be weldingly bonded and brought into contact with the corrosive fluid in the vicinity of the weld. Subsequently, a melting treatment is performed onto the surfaces in contact with the corrosive fluid at toes of the overlaid layer with an input heat of 5 KJ/cm or less. Thereafter, the welding joint portion of the members made of stainless steel is welded. The purpose of this melting treatment is to eliminate the chromium-depleted layer to be generated in the heat-affected portion of the base metal by the overlay welding of the corrosion resistant material and to generate a formation that includes δ ferrite and is superior in corrosion resistance property. Also, a method set forth in Japanese Patent Unexamined Publication No. 53-56134 is similar to that disclosed in the above-described Publication No. 59-21711 in that the melting treatment is performed in the vicinity of the welding joint portion of the stainless steel prior to the welding work. Namely, the method is that the melting treatment is attained by imparting a heat energy such as arc and plasma to a surface layer to be affected by the welding work prior to the welding work of the members made of austenitic stainless steel. According to this method, the δ ferrite is generated when the molten portion through the melting treatment is solidified. Even if the micro structure obtained according to this method is affected by the welding heat, there is no sensitive region due to precipitation of carbides in the crystalline intergranular surfaces in the same manner as the application of the corrosion resistant material.

Another method for coping with the SCC is disclosed in Japanese Patent Examined Publication No. 60-45033. In that method, a corrosion resistant material containing δ ferrite is overlaid by welding on surfaces of the welding members in contact with the corrosive fluid, and thereafter, a material is overlaid by welding on the surfaces opposite to toes of the previously overlaid layer (or bead), while cooling the surface of the latter layer side. The purpose of the overlay welding while cooling is to improve the residual stress in the chromium-depleted region generated in the heat-affected portion of the base metal by the first (or primary) application of the corrosion resistant material.

The well-known methods are effective against the SCC only with respect to the surfaces where the SCC countermeasure has been effected. However, in the conventional methods, there is no consideration of the surface opposite to the treated surface. Accordingly, both side surfaces of the joints must be subjected to the SCC countermeasure in the case where both surfaces of the welding joints are brought into contact with the corrosive fluid. This means that the prior art is only effective in the case where the welded joint is brought into contact with a corrosive fluid on both of opposed surfaces and it is impossible to apply the melting treatment on both the side of the welding joint.

On the other hand, the above-described Publication No. 53-56134 and Japanese Patent Unexamined Publication No. 63-177972 (which generally relates to a cold working) shows a method in which in order to prevent the SCC generation in the heat-affected portion of the welding joint made of austenitic stainless steel, prior to the welding work, the portion of the base metal to be affected by the welding heat is molten by the application of the heat energy. However, this method is not applied to the welded joint that has been already formed.

The present invention has been made under such a technical background.

BRIEF SUMMARY OF THE INVENTION

A primary object of the present invention is to obtain a welded joint made of austenitic stainless steel that is superior in corrosion resistance property, by eliminating a chromium-depleted layer on one of the surfaces of the welded joint and changing the micro structure thereof to one containing the δ ferrite with an excellent corrosion resistance property, in consideration of the chromium-depleted layer and the high residual tensile stress generated in the heat-affected portion of the austenitic stainless steel. Also, this object is to provide a method for suppressing the generation of the SCC during the maintenance and repair of an austenitic stainless steel pipe of a plant that has been already provided.

In order to attain this object, according to a first feature of the invention, for a structure into which the corrosive fluid is to be brought into contact on both surfaces (e.g. inner and outer surfaces) of a heat-affected portion thereof after the austenitic stainless steel has been affected by the welding work, there is provided a method for applying a melting treatment to one surface of the heat-affected portion of the welded joint while cooling the other surface.

According to this melting and solidifying treatment, the chromium carbide generated in the heat-affected region of the weld is changed into a micro structure decomposed into the ferrite and austenite on the melting treatment surface, that is, the micro structure where $\delta$ ferrite is generated to improve its corrosion resistance property. In contrast, with respect to the other surface, the high residual tensile strength (residual thermal stress due to the welding) present in the chromium-depleted layer region (chromium carbide generated region) is improved to a level of $+10$ Kg/cm$^2$ or less, resulting in prevention of the generation of SCC. The reason why the residual thermal stress is improved is that the cooling during the melting and solidifying treatment causes a considerable temperature difference between both the surfaces of the joint in the same manner as the water-cooling welding, so that the residual thermal stress on the cooling side is improved.

The melting treatment may be attained by the application or irradiation of high density energy such as arc discharge (for example, TIG arc), plasma, laser beam and the like.

According to a first aspect of the invention, in the general, the invention is characterized in that the chromium-depleted layer generated by welding the austenitic stainless steel member is molten and solidified by the application or irradiation of a high density energy such as arc and laser beam whereby the chromium carbide in the heat-affected portion of the weld is decomposed and dissolved into ferrite and austenite. According to this treatment, $\delta$ ferrite is generated in the treated surface layer, to thereby obtain the micro structure that is superior in corrosion resistance property. In the case where the other surface is forcibly cooled by water or the like during the melting treatment, an input heat needed for the melting treatment is 1 to 30 KJ/cm. Also, in the case where the other surface is cooled at room temperature without the forcible cooling, the input heat needed for the melting treatment is 5 KJ/cm or less as set forth in Japanese Patent Examined Publication No. 59-21711. The supply of heat falling within such a level may suppress the formation of the chromium-depleted layer heat-affected at the toes (or toes of layer) of the overlaid corrosion resistant material in the melting treatment.

According to a second aspect of the invention, the invention is characterized in that the high tensile stress in the chromium-depleted layer generated by the welding of the austenitic stainless steel members is improved to a level of $+10$ Kg/cm$^2$ or less by cooling one surface of the welding joint while applying the melting treatment to the other surface within the above-described range.

It is well known that a typical austenitic stainless steel is 18Cr-8Ni steel. The austenitic stainless steel is superior to general Cr system stainless steel in corrosion-resistance and also is excellent in high-temperature strength, low-temperature toughness and welding property. Thus, the austenitic stainless steel may be extensively used. The micro structure of the welded stainless steel may be inferred in accordance with a Delong diagram of structure or a Schaeffler diagram of structure. In order to define the austenitic stainless steel herein, the Schaeffler diagram is used (see FIG. 5). In FIG. 5, the abscissa denotes a Cr equivalent ($=\%Cr+\%Mo+1.5\times\%Si+0.5\times\%Nb$), whereas the ordinate denotes a Ni equivalent ($=\%Ni+30\times\%C+0.5\times\%Mn$). The substantially inverted triangular region A in the upper portion of this diagram of structure denotes the austenitic stainless steel region.

PREFERRED EMBODIMENTS OF THE INVENTION

An embodiment of the invention will now be described in more detail.

Figure 1:
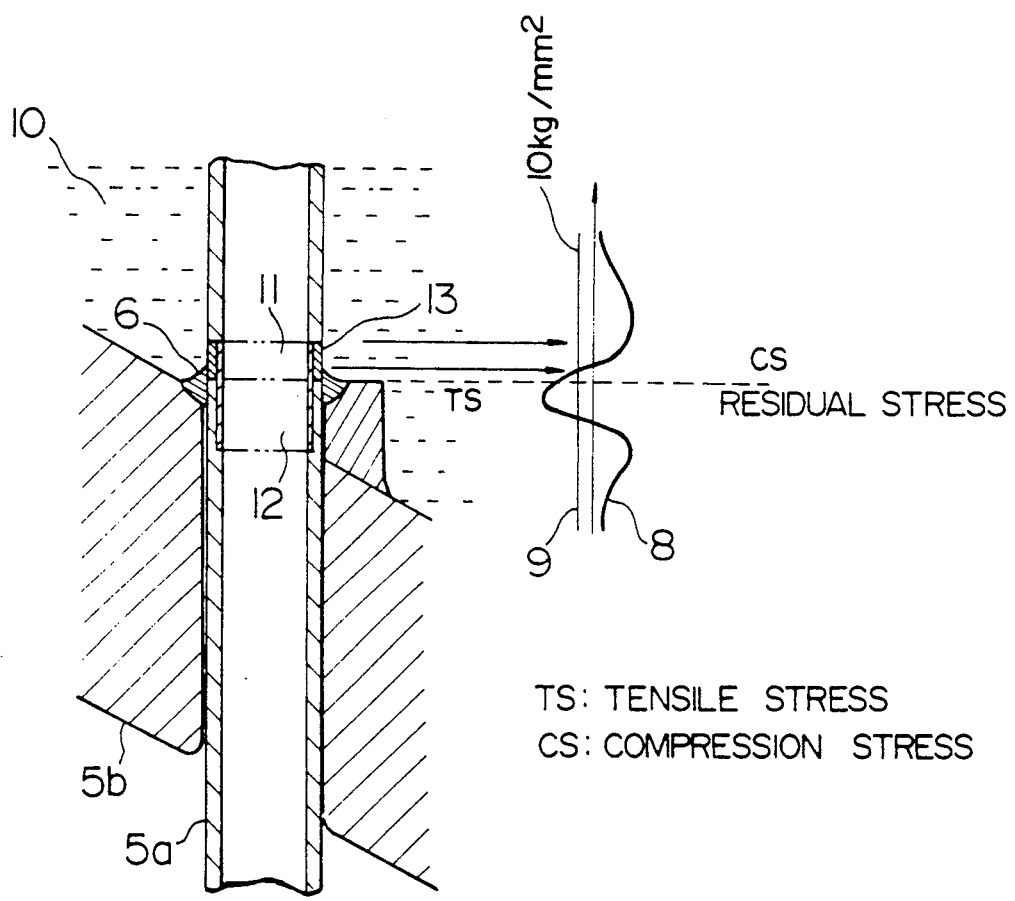
FIG. 1 is a sectional view showing a structure of a welded joint of a pipe to which the weld improving treatment is applied, and a graph showing a residual stress curve of the improved pipe outer surface corresponding to the weld.
Figure 2:
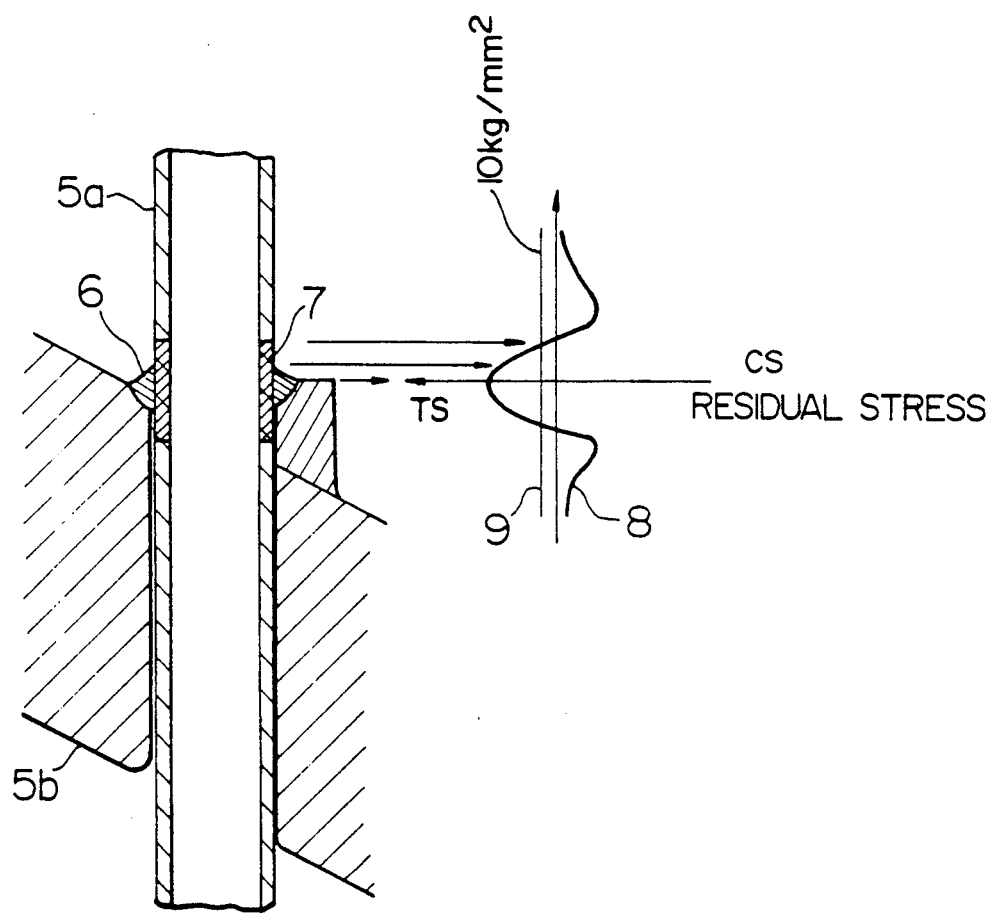
FIG. 2 is a sectional view showing a structure of a welded joint of a pipe to which the weld improving treatment has not been applied, and a graph showing a residual stress curve of the improved pipe outer surface corresponding to the weld.
Figure 3:
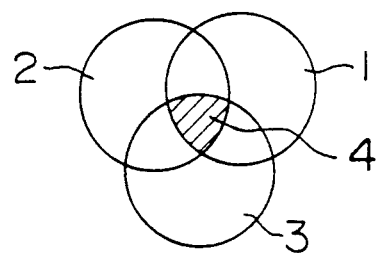
FIG. 3 is an illustration of concept of causes of the SCC generation.
Figure 4:
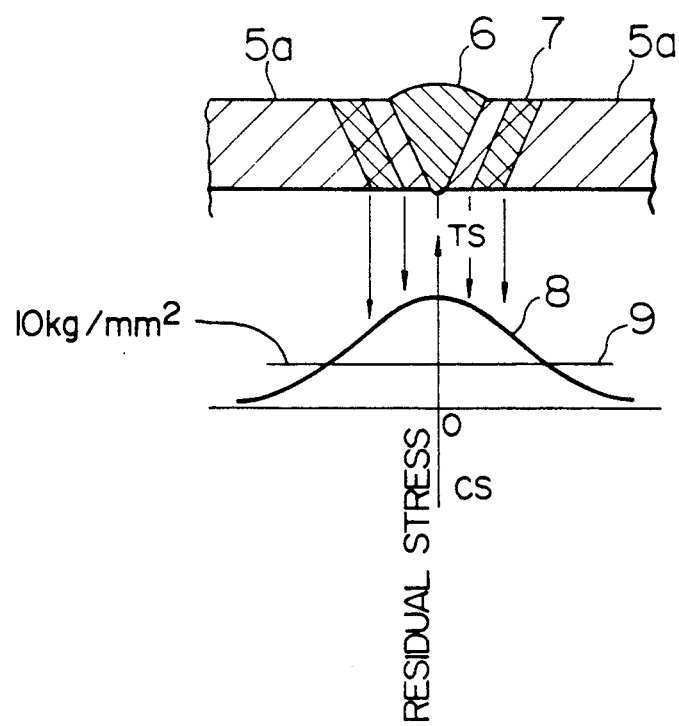
FIG. 4 is a sectional view showing a structure of a welded joint obtained through a general welding work at room temperature.
Figure 5:
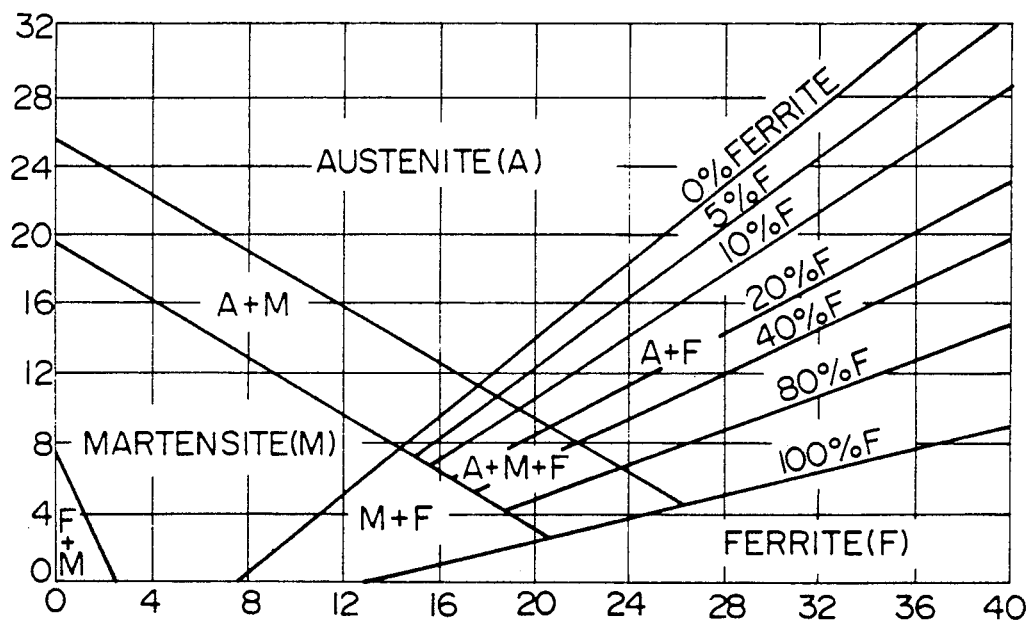
FIG. 5 is a Schaeffler diagram of structure for inferring the micro structure of the welded stainless steel.

FIG. 1 and FIG. 2 schematically show a test piece in accordance with this embodiment. FIG. 2 shows a structure in which a stainless steel pipe 5a having an outer diameter of 50 mm and an inner diameter of 38 mm is passed through a carbon steel thick plate of 100 mm and is fixed thereto by a fillet welding 6.

The chemical composition of the stainless steel pipe according to this embodiment is shown in Table 1.

TABLE 1

| Chemical composition (wt %) | | | | | | |
|---|---|---|---|---|---|---|
| C | Si | Mn | P | S | Ni | Cr |
| 0.05 | 0.39 | 1.12 | 0.032 | 0.015 | 9.08 | 18.35 |

The fillet welding conditions is shown in Table 2.

TABLE 2

| Pass Number | Welding method | Welding heat input (KJ/cm) | Inter-pass temperature (°C.) |
|---|---|---|---|
| 1-3 | TIG | ≦20 | ≦180 |
| 4-14 | SMAW | ≦20 | ≦180 |

*SMAW: shielded metal arc welding

By this welding, a chromium-depleted layer 7 and a high strength residual stress were generated on inner and outer surfaces in the vicinity of the welded spot. An example of the residual stress on the pipe outer surface is shown in FIG. 2. Thus, if the high tensile stress is generated in the chromium-depleted layer and the corrosive fluid is brought into contact with this region, there is a fear that the SCC would be generated.

After the fillet welding, chromium-depleted layer 7 in the pipe inner surface was subjected to a melting treatment by a non-filler TIG welding while cooling the pipe outer surface with water 10 (see FIG. 1).

The non-filler TIG welding with the melting treatment were conducted at an input heat 1 to 30 KJ/cm for the region (or remelted area) 11 where the water cooling effect from the pipe outer surface was present and at 5 KJ/cm (i.e., 1 to 5 KJ/cm) for the region (or remelted area) 12 depending upon the natural cooling. One example of the conditions for welding work is shown in Table 3.

TABLE 3

| No. | Current (A) | Voltage (V) | Speed (cm/min.) | Input heat (KJ/cm) |
|---|---|---|---|---|
| 1 | 100 | 10 | 15 | 4 |
| 2 | 100 | 10 | 20 | 3 |
| 3 | 100 | 10 | 30 | 2 |
| 4 | 100 | 10 | 45 | 1 |

The melting treatment was conducted by the non-filler TIG welding. The chromium-depleted layer was eliminated in the region including the toes of the remelted area. This areas (or regions) contained formed $\delta$ ferrite and was superior in corrosion-resistance.

The residual stress condition of the pipe outer surface is shown in FIG. 1. As shown in FIG. 1, the residual stress of the pipe outer surface 13 in contact with the corrosive fluid was improved on the compression stress side (CS). The stress was less than 10 Kg/mm$^2$ at which the SCC would not be generated.

The results are shown in Table 4.

In this embodiment, assuming that the plate 5b be a lower mirror plate of a nuclear reactor pressure vessel of a BWR plant, and the pipe 5a be a housing portion of an incore monitor (ICM) of the BWR plant, the ICM housing may be repaired with a high corrosion-resistance without replacing the stainless steel ICM housing that has been damaged by the affect of the fillet welding, according to the invention.

TABLE 4

| Region | After fillet welding | Resistance to SCC treatment | After treatment of resistance to SCC treatment |
|---|---|---|---|
| 11 | chromium-depleted layer | *water cooling + *1-30 KJ/cm remelting | *eliminating chromium depleted layer *formation containing δ-ferrite |
| 12 | + high tensile residual stress | *natural cooling + *1-5 KJ/cm remelting | *the same as toes (or boarder) of the remelted area |
| 13 | | *water-cooling + *1-30 KJ/cm remelting | *+10 Kg/mm$^2$ or less in residual stress |

Also, since it is possible to perform the working without discharging the reactor water from the nuclear reactor vessel, the work for discharging the reactor water may be dispensed with. It is also possible to suppress the irradiation of radioactive ray to the worker due to the shielding effect of the radioactive ray. Accordingly, the irradiation of the radioactive ray to the worker may be prevented and the long time work is possible.

According to this embodiment, it is possible to enhance the corrosion-resistance of both surfaces (e.g. inner and outer surfaces of pipe) of the stainless steel weld in the high temperature and high pressure water containing dissolved oxygen. Even if the high temperature and high pressure water containing the dissolved oxygen is brought into contact with the both surfaces of the stainless steel weld and the melting treatment (or remelting treatment) is possible only from one side of the joint, it is possible to insure the highly reliable stainless steel weld with a long service life.

In particular, the present invention is also effective for the case of maintenance and repair of the stainless steel pipe of the already built plant (the case where the high pressure and high temperature water containing dissolved oxygen is brought into contact with the both surfaces of the weld). The invention may be applied to various instruments or components of the nuclear reactor plant under the SCC generation environment.

As has been apparent from the foregoing description, according to the present invention, it is possible to enhance the corrosion resistance property on both surfaces (e.g. inner and outer surfaces) of the stainless steel weld. It is possible to obtain a long service life and highly reliable stainless steel weld even if the high temperature and high pressure water is brought into contact with the both surfaces of the stainless steel weld and the melting treatment (or remelting treatment) is possible only from one side thereof.

What is claimed is:

1. A method for improving a property of a weld of a structure made of an austenitic stainless steel intended to be brought into contact with a corrosive fluid on both of opposed surfaces, at a region having been affected by welding heat, comprising the steps of:
    cooling said thermally affected region on one of said opposed surfaces; and
    simultaneously with said cooling step, applying a melting treatment to the other surface, thereby changing micro structure of the portion to be treated into a micro structure containing delta ($\delta$) ferrite and having superior corrosion resistant property.

2. The method according to claim 1, wherein the melting treatment is perform by applying high density energy to the treated portion.

3. The method according to claim 1, wherein said austenitic stainless steel has compositions defined by an austenite area of a Schaeffler diagram.

4. The method according to claim 1, wherein the structure comprises a stainless steel pipe and the weld comprises a filled weld securing the pipe to a thick metal plate, said melting treatment being effected by an application of high density energy and cooling being effected by contact with water.

* * * * *